(12) United States Patent
Gauthier et al.

(10) Patent No.: US 6,407,169 B1
(45) Date of Patent: Jun. 18, 2002

(54) METHOD FOR SYNTHESIS OF GRAFT POLYMERS

(75) Inventors: Mario Gauthier, Kitchener; Jieming Li, Waterloo; Stephane R. Parent, Richmond Hill; Steven J. Teertstra, Kitchener-Waterloo, all of (CA)

(73) Assignee: The University of Waterloo, Waterloo (CA)

( * ) Notice: Subject to any disclaimer, the term of this patent is extended or adjusted under 35 U.S.C. 154(b) by 0 days.

(21) Appl. No.: 09/734,914

(22) Filed: Dec. 13, 2000

(51) Int. Cl.[7] .............................. C08G 81/02; C08F 8/10
(52) U.S. Cl. ........................ 525/106; 525/70; 525/63; 525/191; 525/280
(58) Field of Search ...................... 525/106, 70, 63, 525/191, 280

(56) References Cited

U.S. PATENT DOCUMENTS

| | | | |
|---|---|---|---|
| 4,853,436 A | | 8/1989 | Ohata et al. |
| 4,857,630 A | | 8/1989 | Kim |
| 5,196,502 A | | 3/1993 | Turner et al. |
| 5,397,841 A | | 3/1995 | DuBois et al. |
| 5,631,329 A | | 5/1997 | Yin et al. |
| 6,084,030 A | | 7/2000 | Janssen et al. |
| 6,127,481 A | * | 10/2000 | Janssen et al. ............... 525/106 |

OTHER PUBLICATIONS

Tomalia, D. A. et al., M.S. Macromolecules, 1991 pp. 1435–1438, vol. 24.
Gauthier, M. et al., "Macromolecules", 1991, pp. 4548–4553, vol. 24.
Gauthier, M. et al., "Macromolecules", 1996, pp. 519–527, vol. 29.
Hempenius, M. A. et al., "Macromolecules", 1997, pp. 5602–5605, vol. 30.
Al–Mallem, H. A. et al., Polym. Prepr. 1998, pp. 623–684, vol. 39(2).
Deffieux, A. et al., "Macromol. Symp.", 1998, pp. 45–55, vol. 132.
Kee, R. A. et al., "Macromolecules", 1999, p. 6478–6484, vol. 32.
Knauss, D. M. et al., "Polym. Mater Sci. Eng.", 1999, p. 153–154, vol. 80.
Kee, R. A. et al., "Polym. Prepr.", 1999, pp. 165–166, vol 40(2).
Knauss, D. M. et al., "Macromolecules", 2000, p. 3557–3568, vol. 33.

* cited by examiner

Primary Examiner—James J. Seidleck
Assistant Examiner—Olga Asinovsky
(74) Attorney, Agent, or Firm—Santosh K. Chari; Orange & Chari (57) ABSTRACT

A process for the synthesis of branched graft polymers comprises acylating a first polymer and grafting thereto a second polymer, the second polymer having reactive groups capable of being bound to the acyl groups on the first polymer. The acylation and grafting steps can be repeated to produce graft polymers having a dendritic architecture. The invention also provides polymers produced by the above process, which may be simple branched (comb) polymers, or dendritic polymers.

21 Claims, 2 Drawing Sheets

METHOD FOR SYNTHESIS OF GRAFT POLYMERS

BACKGROUND OF THE INVENTION

1. Field of the Invnetion

The present invention relates to the processes for synthesizing branched polymers. More specifically, the invention relates to a method for synthesizing graft polymers and, more specifically, those polymers having a dendritic architecture.

2. Description of the Prior Art

Synthetic polymers can take one of two general forms: linear or branched. Linear polymers are composed of the polymer backbone and pendent side groups inherent to the individual repeating units. Branched polymers have discrete units which emanate from the polymer either from the backbone or from the pendent groups extending from the individual repeating units. The branches have the same general chemical constitution as the polymer backbone. The simplest branched polymers, sometimes referred to as comb branched polymers, typically consist of a linear backbone which bears one or more essentially linear pendent side chains. Dendritic polymers are created by adding sub-branches to the branches extending from the main backbone. Dendritic polymers can be subdivided into 3 main categories: dendrimers, hyperbranched polymers and arborescent (or dendrigraft) polymers. Dendrimers are mainly obtained by strictly controlled branching reactions relying on a series of protection-coupling-deprotection reaction cycles involving low molecular weight monomers. Hyperbranched polymers are obtained from one-pot random branching reactions of polyfunctional monomers, resulting in a branched structure that is not as well defined as for dendrimers. Arborescent (or dendrigraft) polymers are obtained by successive grafting reactions of polymeric side chains on a polymer backbone.

Many methods have been developed for the synthesis of dendritic polymers which can be separated into four general categories of reactions. The first category involves a one-step process in which hyperbranched polymers are produced during polymerization as described in U.S. Pat. Nos. 4,857,630 and 5,196,502. In such a process, monomers with pendent groups capable of supporting polymer chain growth are added to the polymerization reaction along with the other monomers. The degree of branching in this reaction is proportional to the relative concentration of the reactive monomer. One of the drawbacks of this method is that the chains produced are of varying lengths and these reactions have to be closely monitored and controlled due to their tendency to form highly cross-linked and insoluble gels. A further drawback is that the entire dendritic polymer will be composed of the same polymer or copolymer. In certain applications, it is desirable to have the inner branch polymers and the outer branch polymers to differ in composition and type.

Another reaction method, in which dendrimers are produced, involves incorporating into the growing polymer chain, "blocked" monomers with pendent groups capable of supporting polymer chain growth. The "blocking" prevents the monomers from binding to other groups and therefore prevents the generation of sub-branches. Following the synthesis of the linear polymer, these sites can be de-blocked and reacted with monomers to generate the required branching. Examples of this method are provided in U.S. Pat. Nos. 4,853,436 and 6,084,030. This method avoids the problem of cross-linking, and allows for the generation of branched polymers which have different chains on the inner and outer surface. The drawback of this method is that a new reaction is required to change the degree of branching. Furthermore, reaction conditions need to be optimized to achieve the exact mixture of reactive and non-reactive monomers in a chain, and the length of the chain. Also, the nature and characteristics of the polymers may change due to the addition of the reactive monomers in the polymer chain.

The third method for generating dendritic polymers is by graft polymerization. Examples of this process are provided in U.S. Pat. Nos. 5,397,841 and 5,631,329. According to this method, a polymer is generated incorporating reactive monomers with pendent groups capable of accepting an addition reaction. A second set of polymers, which will become the branches, are generated with functionalized end groups. Under appropriate conditions, the functionalized end groups form chemical bonds with the activated pendent groups. The newly formed branches may also have incorporated within them pendent groups which are capable of supporting further branch formation. This method avoids the problem of cross-linking, and allows for the generation of branched polymers which have different chains on the inner and outer surface. It overcomes the above mentioned drawback of uniform chain length since the chains are preformed and can be characterized prior to incorporation. However, the drawback with this method is that a different synthesis reaction is required to change the degree of branching. Furthermore, the reaction conditions need to be optimized to achieve the exact mixture of reactive and non-reactive monomers in a chain. In addition, the nature and characteristics of the polymers may change due to the addition of reactive monomers in the polymer chain.

The final method for generating dendritic polymers by graft polymerization is by introducing chloromethyl groups onto linear polymer, and grafting polymers onto those reactive groups, as described in U.S. Pat. No. 5,631,329. The chloromethyl groups are capable of undergoing substitution reactions with the functionalized end groups on other polymers. The newly formed branched polymer may also be provided with further chloromethyl reactive groups thereby allowing for dendritic branching of the polymer. This method has the advantage that the degree of branching is controlled by the number of chloromethyl groups added. This method also has the advantage that additional polymerization steps are not required. Linear polymers of defined length and composition can be used. The disadvantage of this method is that a large excess of chloromethyl methyl ether, a potent carcinogen, is required to generate the chloromethyl grafting sites. A further limitation is the requirement that the optimum temperature for the reaction is $-30°$ C.

It is an object of the present invention to obviate or mitigate at least some of the above mentioned disadvantages.

SUMMARY OF THE INVENTION

According to a preferred embodiment of the present invention, there is provided a method for the synthesis of branched or dendritic polymers, which may be either homopolymers of copolymers. The process involves a first polymer which is acylated, and a second polymer which is grafted onto the acyl groups. The first and second polymer may be linear, branched or dendritic.

In accordance with this aspect of the present invention, there is provided a process wherein a polymer may be subjected to at least two cycles of acylation and grafting.

The present invention provides, in another aspect, the polymers produced by said process, which may be in the form of simple branched (comb polymers), or dendritic polymers.

BRIEF DESCRIPTION OF THE DRAWINGS

These and other features of the preferred embodiments of the invention will become more apparent in the following detailed description in which reference is made to the appended drawing wherein.

DESCRIPTION OF THE PREFERRED EMBODIMENTS

In one aspect, the invention provides a method of generating branched and dendritic polymers. Generally, according to a preferred embodiment, the method of the present invention includes the following steps:

1. A first polymer is reacted with an acylating agent such that acyl groups are bound to the polymer.
2. A second polymer having functional groups reactive towards acyl groups is reacted with the first polymer such that a bond is formed between the functional groups and the acyl groups. The first polymer may be a homopolymer or copolymer, and may be in a linear, branched, or dendritic form. The second polymer may be a homopolymer or copolymer, and may be in a linear, branched, or dendritic form.
3. The grafted polymer generated by the above reaction may be subjected to several cycles of acylation and grafting to generate a dendritic or arborescent polymer.

The invention also provides a method of grafting one polymer with at least one other polymer. The method entails forming a chemical bond between a terminus of the second polymer and a position anywhere along the length of the first polymer.

Preparation of the Acylated First Polymer

Figure 1:
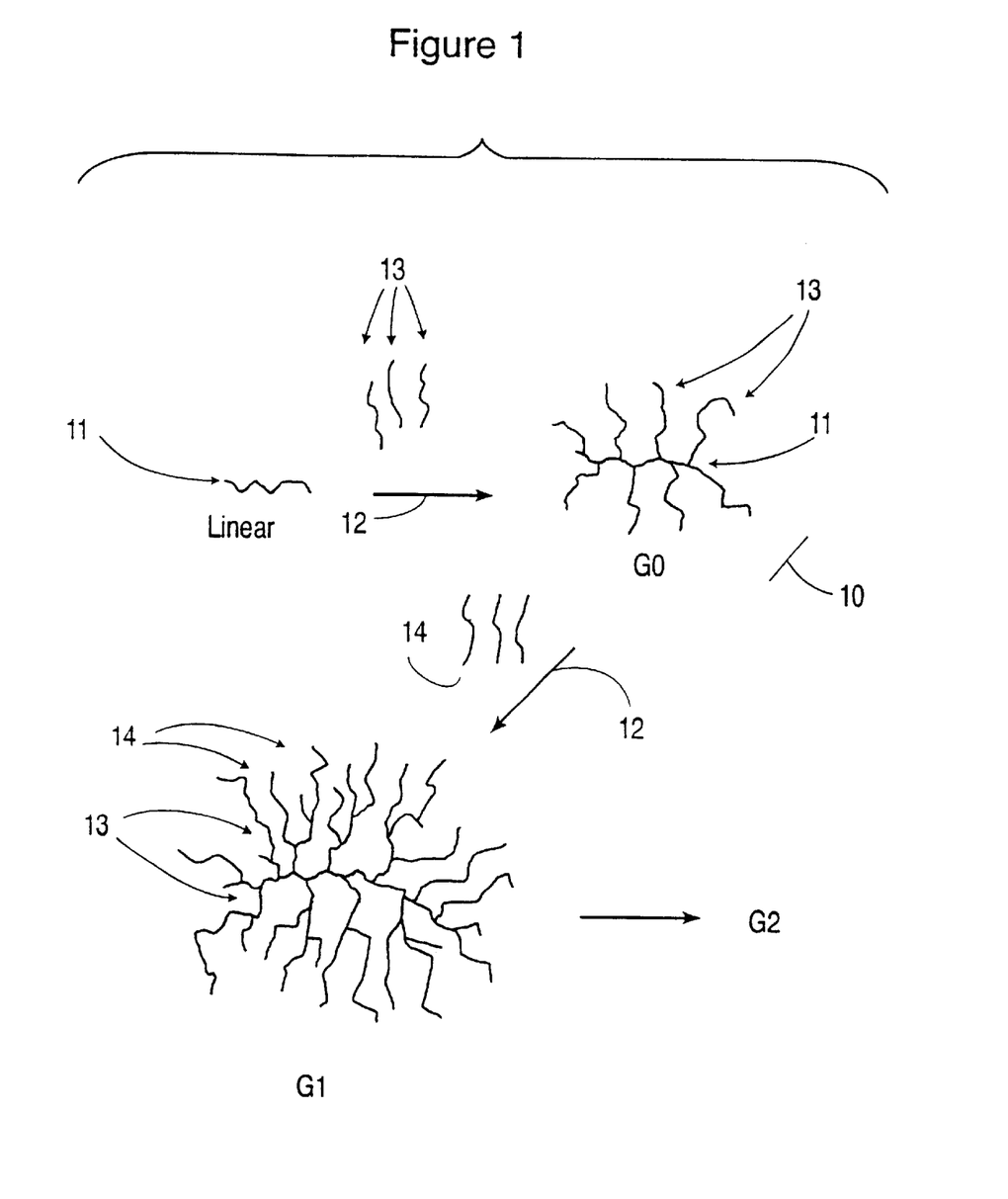
FIG. 1 is a schematic representation of the grafting reaction according to a preferred embodiment of the invention.

A first polymer is the core polymer to which other polymer molecules will be grafted by the method described below. The first polymer 11 may be a homopolymer or a copolymer, and may be in a linear form, as depicted in FIG. 1. The first polymer may also be branched, wherein linear polymers are attached to a linear core polymer, or dendritic wherein the polymers forming the branches have polymer branches attached to them. In the preferred embodiment, the first polymer is linear and should be a substrate for an acylation reaction. The first polymer may be generated by polymerization of the appropriate monomers by methods known in the art. In a preferred embodiment, the first polymer is generated by anionic or cationic polymerization of alkene monomers which generally produces polymers with a narrow molecular weight distribution. The first polymer may also be generated by other techniques known in the art for the generation of linear, branched or dendritic polymers.

Following the generation of the first polymer, it may be purified from non-reacted monomers and other excipients. The polymer may then be analyzed for uniformity of length and composition, and further purification may be required to isolate a sub-population of polymers with specific characteristics. One parameter to consider is the apparent (polystyrene equivalent) polydispersity index, which is a measure of the uniformity of the population of polymers. The apparent polydispersity index ($M_w/M_n$) is calculated as the ratio of the apparent weight-average molecular weight ($M_w$) of the polymers over the apparent number-average molecular weight ($M_n$). The $M_w/M_n$ may be determined by size exclusion chromatography (SEC) analysis based on a linear polystyrene standards calibration curve. In a preferred embodiment, values below 1.1 are expected.

Figure 2:
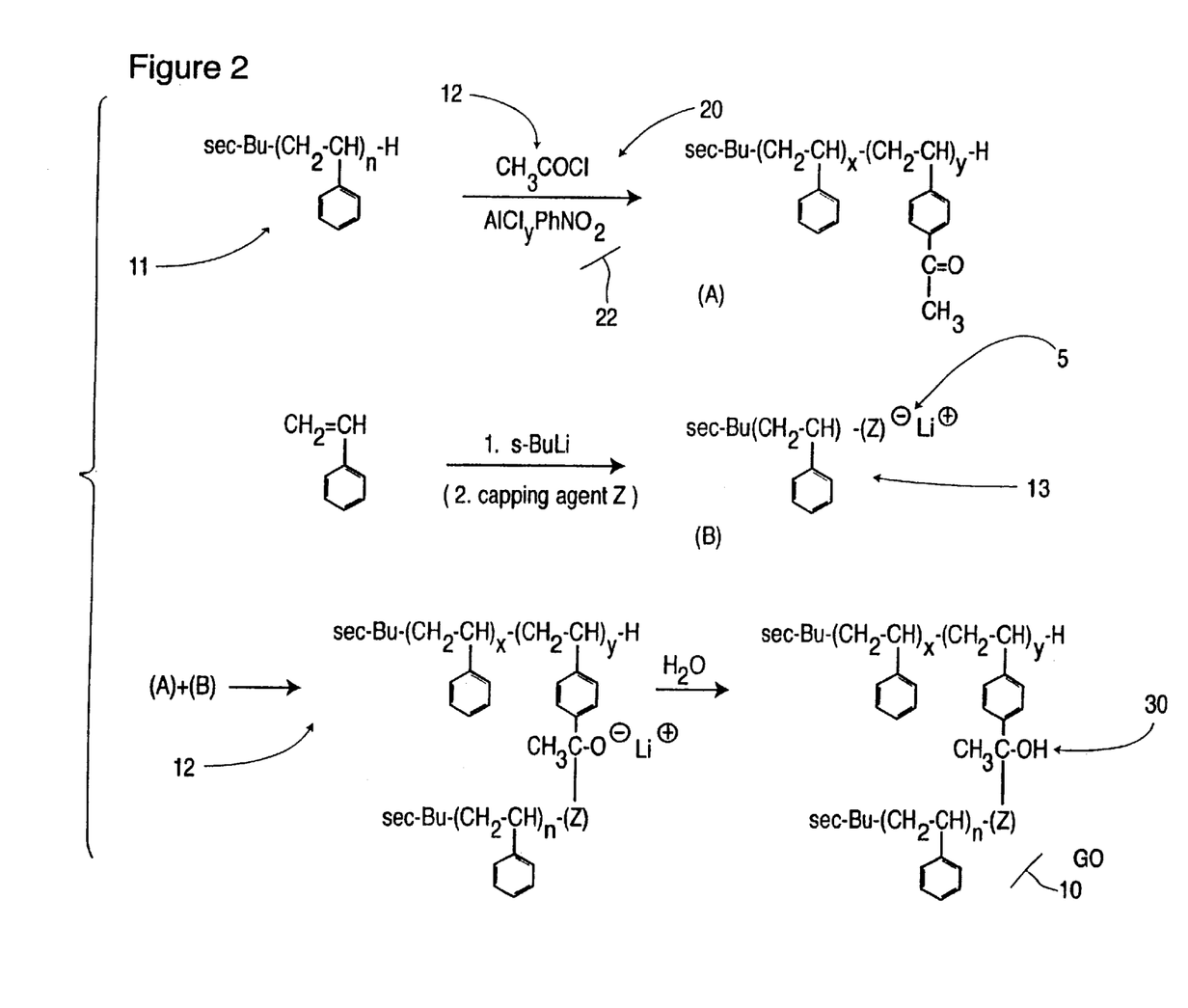
FIG. 2 is an alternate representation of the reactions depicted in FIG. 1.

The first polymer is acylated to chemically bond acyl groups along its length. As depicted in FIG. 2, a first polymer 11 is combined with an acylating agent 20 and catalyst 22 in a suitable solvent. Acylating agents suitable for use in the present invention have the formula: R-COCl where R is an alkyl or aryl group. In a preferred embodiment, the acylating agent is an acetylating agent, and the first polymer is acetylated by first being dissolved in the dry solvent nitrobenzene, and then reacted with acetyl chloride as the acylating agent and $AlCl_3$ as the catalyst at ambient temperatures (15–25° C.). In alternate embodiments, the first polymer may be propionylated or benzoylated. It will be evident to those skilled in the art, that other solvents, reaction temperatures and catalysts may also be used depending on the acylating agent utilized.

In a preferred embodiment, the first polymer will be acylated to levels of 20–30 mol %, or 20–30% of the subunits in the polymer will bear an acyl group. The degree to which the first polymer is acylated will be proportional to the number of branches that can be grafted onto the first polymer, within certain limitations. In reactions involving first polymers that are heavily acylated, not all the acyl groups may be accessible to reactions due to steric hindrance. The degree to which the first polymer is acylated may be determined by $^1$H-NMR spectroscopy. In the preferred embodiment wherein the first polymer is acetylated polystyrene, the degree of acetylation can be determined by comparing the $^1$H-NMR spectrum of the acetylated polystyrene to that of the original polystyrene. The introduction of the acetyl groups causes two new resonances at $\delta=2.30-2.75$ ppm (acetyl group) and $\delta=7.30-7.80$ ppm (proton α- to the acetyl group on the benzene ring). Other methods to determine the acylation levels will be obvious to those skilled in the art. The degree of acylation of the first polymer may be controlled by varying the concentration of the acylating agent used, or by methods which will be obvious to those skilled in the art.

If the first polymer is highly acylated, there is the risk of cross-linking or cleaving the polymer. To determine the degree of cross-linking or polymer cleavage, the polydispersity index of the polymer should be determined before and after acylation. In the preferred embodiment, both indices should be similar (±0.01–0.02), which would indicate limited cross-liking. An increase of more than 0.05 indicates considerable cross-linking in the acylation reaction. The absence of chain cleavage can be verified by the lack of a low molecular weight fraction in the SEC chromatogram.

Preparation of the Second Polymer

The second polymer is the polymer that will be grafted onto the first polymer. The second polymer may be a homopolymer or copolymer, and may be linear, branched, or dendritic, although linear is preferred. The second polymer will have reactive groups capable of forming a chemical bond with the acyl groups on the first polymer. In a preferred embodiment, the reactive groups are anionic groups. In a more preferred embodiment, the second polymer includes one reactive group. In the most preferred embodiment, depicted in FIG. 2, the basic anionic group 18 on the second polymer 13 is located at a substantially terminal position. The preferred method for generating a linear second polymer is by the isolation of 'living' polymers in an anionic polymerization. Living polymers are polymers that have an ionized end group with which additional monomers may react. Preferably, the branched second polymers in the method of the invention have a single anionic reactive site. One method for generating branched and dendritic second polymers is described in *Macromolecules*, 2000, Vol. 33, page 3557–3568.

Second polymers such as those derived from isoprene and 2-vinylpyridine may be used directly in reactions to generate branched and dendritic polymers. Certain second polymers, such as polystyryl anions, are highly reactive basic anions, and may abstract a hydrogen ion during the grafting reaction and be neutralized. Grafting reactions involving these highly basic second polymers will result in a low grafting yield. To reduce the basicity of these second polymers after they are formed, the second polymer may be reacted with a capping agent. Capping agents are molecules that chemically bind to the anionic terminal group and together with the terminal group, form the reactive group on the second polymer as mentioned above. Second polymers with capping agents are therefore less likely to undergo side reactions. In a preferred embodiment, the capping agents are monomers that undergo an anionic polymerization reaction with the second polymer. In the most preferred embodiment, the capping agents are 2–5 equivalents of monomers are added per end chain. Second polymers capped with these monomers have a decreased basic charge. The capping agents preferred in the method need to be relatively small to avoid steric hindrance which may decrease the efficiency of the grafting reaction. For example, capping agents derived from 1,1-diphenylethylene (DPE) and α-methylsytrene may be used in the method, they may not be preferred since they may also reduce the efficiency of the grafting reaction due to steric hindrance. Capping agents with minimal steric effects such as those derived from isoprene and 2-vinylpyridine are preferable for optimized grafting efficiency. As will be evident to those skilled in the art, other capping agents may also be used.

Following the polymerization process and the addition of any capping agents, the second polymer may be purified and analyzed prior to further reactions. As will be apparent to those skilled in the art, the anionic charge on the second polymer must be preserved for the reaction with the acyl groups of the first polymer.

Generation of the G0 Polymer

The G0 polymer 10 is the product generated by one cycle of acylation of the first polymer and grafting of the second polymer. Typically, if both the first polymer and second polymer are linear, the G0 polymer will have a branched or comb structure as depicted in FIG. 1. To generate the G0 polymer, the first polymer and the second polymer are combined in a suitable solvent under conditions that will allow the reactive group on the second polymer to form a bond with the acyl groups on the first polymer. In a preferred embodiment, wherein the first polymer is acetylated polystyrene, and the second polymer is 2-vinylpyridine capped polystyrene, the reaction is carried out in the solvent tetrahydrofuran (THF) at ambient temperatures (15–25° C.). First polymers that are benzoylated or propionylated may be reacted with 2VP capped polystyrene under similar reaction conditions to generate a G0 polymer. In the preferred embodiment, depicted in FIG. 2, the reaction is a nucleophilic addition reaction in which the basic anion of the reactive group on the second polymer attacks the carbon forming the carbon-oxygen double bond of the acyl group, creating an intermediate oxygen anion. The oxygen anion acquires a proton to form a tertiary alcohol group 30 upon exposure to water or other proton source.

In nucleophilic addition reactions involving the second polymer and acyl groups, the reaction will proceed spontaneously under appropriate solvent and temperature conditions. However, the second polymer may also undergo side reactions wherein the anionic reactive group abstracts a hydrogen ion and is neutralized. Neutralized second polymers can no longer undergo nucleophilic addition reactions, and will thus decrease the yield of the required G0 polymer.

To decrease the incidence of side reactions, a reaction modifier is utilized during the grafting reactions. The reaction modifier suppresses the anionic charge of the second polymer, and thus lowers the incidence of side reactions. In a preferred embodiment, the reaction modifier is a metal ion, and in the most preferred embodiment, the reaction modifier is ionic lithium in the form of lithium chloride (LiCl). As shown in FIG. 2, the lithium ions 18 suppress the anionic charge of the second polymer 13. By decreasing the incidence of side reactions the second polymers maintain their anionic charge and are therefore available to react with the acyl groups of the first polymer. In the preferred embodiment, lithium chloride is added at a 5:1 molar ratio relative to the chain end concentration of the second polymer in the grafting reaction. As will be evident to those skilled in the art, other aromatic or aliphatic solvents, reaction modifiers and reaction temperatures may also be used.

In the preferred embodiment, the molar ratio of the second polymers to acyl groups on the first polymers in the reaction should be sufficient to ensure all the accessible acyl groups will be reacted. For reactions involving linear first and second polymers, this can be accomplished by adding at least a stoichiometric amount of second polymer to the number of acyl groups. This value may be calculated following determination of the degree of acylation of the first polymer. In the most preferred embodiment, an excess amount of second polymer is added to the reaction such that 3–5% remains unreacted. This method results in the production of G0 polymers with a better defined structure.

Although it is not essential, the progress of the reaction and the degree to which the polymers have reacted may be monitored. In a preferred embodiment, samples are removed from the grafting reaction and analyzed by SEC. Unreacted polymer will be detected as relatively low molecular weight species compared to the graft polymer. The results of such analysis may be used to monitor the progress of the reactions. In another preferred embodiment, the second polymers used in the reactions have a color that disappears when the second polymer reacts with the acyl group. The change in color can be use as a gauge to achieve the desired degree of reaction of the second polymer.

As will also be obvious to those skilled in the art, under certain circumstances, not all the acyl groups may be accessible for grafting due to steric hindrance. This may occur in particular if the first polymer is a branched or dendritic polymer and is heavily acylated, or if long chain second polymers are grafted. Also, in certain circumstances, G0 polymers may be generated in which only a fraction of the acyl groups are reacted with the second polymer. For example, the remaining acyl sites may be reacted with another molecular species. For these reactions, the amount of second polymer to be added may also be calculated knowing the degree of acylation of the first polymer.

Following the grafting reaction, the branched G0 polymer may be purified and analyzed. As shown in FIG. 1, the G0 polymer is a branched polymer with a substantially linear backbone and bears substantially linear side chains. This is a typical product generated by reactions in which both the first and second polymers are linear. As will be obvious to those skilled in the art, the form of the G0 polymer is determined by the structure of the first and second polymers. For example, the first polymer may be relatively short in length to generate a "star" shaped G0 polymer, or the first polymer may be relatively long to generate a "comb" shape after grafting. The first polymer may also be branched by a variety of methods known in the art to generate a G0 polymer with a dendritic architecture.

Generation of G1 and G2 Polymers

The above generated G0 polymer may be used as a substrate for another cycle of acylation and grafting. As shown in FIG. 1, the G0 polymer is acylated (12) and a second polymer (14) is reacted with the G0 polymer under similar grafting conditions described previously. The reaction produces a G1 polymer wherein the branches have sub-branches. Although polymer 13 and polymer 14 are both macroanions that can form bonds with acyl groups, the different reference numbers shown above and in FIG. 1 are meant to illustrate that second polymers used in successive reaction cycles need not be the same. Again, the degree of branching of the G1 polymer will be proportional to the degree to which the G0 polymer is acylated, within certain limitations described below. In reactions wherein the G0 polymer has a general comb shape, the second polymer is added in a stoichiometric amount to the number of acyl groups present on the G0 polymer to generate the G1 polymer. Repeating the acylating/grafting cycle using the G1 molecule as substrate will generate a more highly branched G2 molecule. As will be apparent to those skilled in the art, as the numbers of branches increases with each generation, acyl groups that are on the core polymer or on the branches near the core polymer may not be accessible for grafting due to steric hindrance. This may result in a decrease in the grafting efficiency or the number of second polymers that may react with a given number of acyl groups. In reactions wherein the G0 and G1 were generated with linear first and second polymers, reactions to generate G2 and G3 generations require 30–50% less second polymer compared to the number of acyl sites on the polymer. As previously described, progress of the grafting reaction may be monitored by SEC or color change if the second polymer is colored.

The cycle of acylation and grafting may be repeated to generate molecules of generation and higher. Cycling may continue until the polymer has achieved a desired size, however the grafting efficiency will continue to decrease due to the steric hindrance. The polymer will also increase in size and will eventually resemble a cross-linked latex particle or a 3-D matrix molecule.

Following the completion of a cycle of acylation and grafting, the polymer may be further modified to increase its thermal stability. Studies on the thermal stability of the polymers generated by the above method have revealed that heating the polymer to 60–70° C. for 1–2 hours will cause the grafted polymer chains to be cleaved. This presumably occurs since the acyl groups are converted to tertiary alcohol groups 30 in the grafting reaction. These OH groups which can dehydrate readily leading to the preferential elimination of the grafted polymer chains. This tendency toward dehydration can be greatly reduced if the polymer is treated to either block the tertiary alcohol groups, or to convert the tertiary alcohol groups to another, more thermally stable groups by methods known in the art. In a preferred embodiment, the graft polymer is treated with a small amount of water and thionyl chloride, thus converting the tertiary alcohol groups to more thermally stable chloride groups. Polymers thus modified exhibit no chain cleavage when heated to 100–200° C. for 24 hours.

In the preferred embodiment, in which the first polymer is acetylated using $AlCl_3$ as a catalyst, the step of blocking or converting the tertiary alcohol group may be performed only after the last grafting reaction. For example, if a G3 polymer is desired, the water/thionyl chloride treatment is only used after the last (fourth) grafting reaction. For the polymers up to G2, the HCl generated during the acetylation reaction from the $AlCl_3$ catalyst converts the tertiary alcohol groups into chlorides groups. There is, therefore, no need for the stabilization treatment at each generation.

The following examples are provided to illustrate the preferred embodiments of the invention and should not be considered as limiting the invention in any way.

General Reaction Conditions

Polymerization and grafting reactions were carried out in a 2-litre glass reactor under nitrogen atmosphere. The reactor was first evacuated and flamed to remove air and moisture. The solvents, toluene and cyclohexane, were dried by refluxing under inert atmosphere with oligostyryllithium, while the solvent tetrahydrofuran (THF) was dried by refluxing with sodium-benzophenone ketyl. The styrene, isoprene and 2-vinylpyridine monomers were purified by methods suitable for anionic polymerization. The grafting substrate was purified by azeotropic distillation with dry THF and redissolution in THF. Polymerization and grafting reactions were terminated with degassed methanol. The apparent (polystyrene equivalent) number-average molecular weight ($M_n$) and weight-average molecular weight ($M_w$) used to calculated the polydispersity index ($M_w/M_n$) of the polymers may be determined by size exclusion chromatography (SEC) analysis based on a linear polystyrene standards calibration curve.

EXAMPLE 1

Synthesis of Acetylated Polystyrene Substrates

Synthesis of the first polymer: 40 g linear polystyrene with $M_n=5 \times 10^3$ g/mol and $M_w/M_n=1.06$ was first prepared from purified styrene in 500 mL THF/toluene solvent mixture by anionic polymerization using sec-butyllithium (8 mmol) as initiator. The polymerization was initiated in 300 mL toluene at room temperature for 15 min, and completed in the THF/toluene mixture at −78° C. for another 15 min. After isolation of the product, grafting sites were introduced on the linear polymer by acetylation. An acetylation level of 30 mol % was used in most reactions, to give ~15 grafting sites per chain on average. The grafting density of the polymers can also be varied by controlling the acetylation level of the grafting substrate. In a typical acetylation procedure, 7.5 g polystyrene (~72 meq styrene units) previously dried in vacuum was dissolved in 100 mL dry nitrobenzene. A solution consisting of 3.15 g (~24 mmol) anhydrous $AlCl_3$ and 1.85 mL (26 mmol) acetyl chloride dissolved in nitrobenzene to a total volume of 10 mL was then added drop-wise to the polymer solution at room temperature. The reaction was allowed to proceed for 45 min after the addition of the solution. The product was isolated by first stopping the reaction with 100 mL $HCl/H_2O$ (50/50 v/v) and three extractions with 100 mL each of the $HCl/H_2O$ mixture to remove catalyst residues. The acetylated polymer was then precipitated in 1.5 L methanol, and recovered by filtration. Further purification was achieved by redissolution of the dry polymer in toluene (100 mL) and precipitation in methanol (1 L) twice. The polymer was then dissolved in chloroform (100 mL) and 5 extractions were performed with HCl/H$_2$O mixture, and two more with water. The acetylated linear polystyrene was finally recovered by precipitation in methanol, filtration and drying under vacuum.

Synthesis of the second polymer: Separate ampules containing purified styrene monomer (15 g in 75 mL THF) and the 2VP capping agent in THF (0.63–1.25 g in 50 mL THF) were first prepared. The synthesis of a G0 arborescent polystyrene involved the polymerization of styrene in 300 mL THF at −78° C. for 30 min, using 3 mmol sec-butyllithium as initiator in the presence of 15 mmol LiCl. The end-capping agent 2VP was then added, to give a color change from orange to dark red. A sample of the capped side chains, removed and deactivated with degassed methanol, had a $M_n=5\times10^3$ g/mol and $M_w/M_n=1.09$.

G0 polystyrene: A comb (arborescent polymer generation G0) polystyrene was prepared by reacting living polystyryl anions capped with 2-vinylpyridine (2VP) with the acetylated linear polystyrene substrate in the presence of LiCl. The living (second) polymer was warmed to about 25° C., and the acetylated linear polystyrene solution was slowly added until the red color almost disappeared. After 30 min, the reaction was terminated with degassed methanol. The crude product consisted of about 95% comb G0 graft polystyrene and 5% linear polystyrene by weight. After concentration of the solution and precipitation in methanol, non-grafted side chains could be removed from the crude product by fractionation in a toluene/methanol mixture. The polymer had a low polydispersity index ($M_w/M_n=1.08$). The G0 polystyrene could be acetylated according to the acetylation procedure described above to produce an acetylated G0 polystyrene grafting substrate.

G1, G2 and G3 polystyrenes: Generation 1–3 arborescent polystyrenes were prepared using the same techniques described for the synthesis of the G0 polymer. The living polymer solution was warmed to about 25° C., and a solution of the acetylated G0, G1, or G2 polystyrene substrate was slowly added to a point where the red color almost disappeared. After 30 min the reaction was deactivated with degassed methanol. The grafting yield was then determined by calculating (approximately) the weight fraction of side chains that became attached to the acetylated backbone. Grafting yields of 89%, 84% and 75% were obtained for the G1, G2 and G3 arborescent polystyrenes, respectively.

It is also possible to cap the polystyryllithium chains with a few isoprene units prior to grafting, rather than 2VP. There are two disadvantages to this approach, however. As discussed below, the anions generated from isoprene are lighter coloured than those obtained from 2VP, complicating the titration process. Partial cleavage of the grafted side chains is also observed in subsequent acetylation reactions, making it necessary to remove the cleaved chains by fractionation prior to grafting.

Synthesis of Graft Copolymers

EXAMPLE 2

Synthesis of Polystyrene-graft-polyisoprene Copolymers (a) A living isoprene homopolymer (polyisoprene or PIP) was prepared by polymerizing isoprene (15 g) in THF (300 mL). Samples may also be polymerized in low polarity solvents such as cyclohexane to obtain a high cis-1,4-microstructure content, but the grafting efficiency is lower. The polymerization was initiated by adding 3 mmol sec-butyllithium in the presence of 15 mmol LiCl. The reaction was continued for 30 min at 0° C. A sample of the PIP side chains, removed and deactivated with methanol, had a $M_n5\times10_3$ g/mol and $M_w/M_n=1.05$.

(b) The living polymer solution was warmed to about 25° C., and a solution of acetylated linear, G0, G1 or G2 polystyrene substrate was slowly added to the point where the yellow-green color of the PIP anions almost disappeared. After 30 min the reaction was deactivated with degassed methanol. Typical grafting yields are ca. 94%, 91%, 85% and 75% for the G0, G1, G2 and G3 copolymers, respectively.

The PIP chains can be capped with 2VP prior to grafting, rather than used on their own. This has the additional advantage that the color of the anions thus generated is darker. It is easier to monitor the titration of the living anions (and the end point) by this method.

EXAMPLE 3

Synthesis of polystyrene-raft-poly (2-vinylpyridine) Copolymers (a) Living poly(2-vinylpyridine), P2VP, anions were prepared by polymerizing 2-vinylpyridine (15 g) in THF (300 mL). Polymerization was initiated with 3 mmol sec-butyllithium in the presence of 15 mmol LiCl, and continued for 30 min at −78° C. A sample of the dark red living P2VP solution was removed and terminated with degassed methanol. The polymer obtained had $M_n=5\times10^3$ g/mol and $M_w/M_n=1.06$.

The living P2VP solution was warmed to about 25° C., and slowly titrated with a solution of acetylated linear, G0, G1 or G2 polystyrene substrate to a point where the red color almost disappeared. After 30 min the reaction was terminated with degassed methanol. Typical grafting yields were 95%, 90%, 86% and 77% for the G0, G1, G2 and G3 copolymers, respectively.

In large scale grafting reactions using chains capped with 2-vinylpyridine in which yields where expected to be 50–100 g, a significant amount of coupling (sometimes >50%) of the living polymer chains to give "dimers" can be observed. This is presumably due to the attack of non-capped polystyryl anions on the chains capped with 2-vinylpyridine. The side reaction can be avoided if the polystyryllithium chains are reacted with a single 1,1-diphenylethylene unit prior to capping with 2VP and grafting.

EXAMPLE 4

G0 Polystyrene Based on Benzoylated Polystyrene

A comb (arborescent polymer generation G0) polystyrene was prepared by reacting living polystyryl anions capped with 2-vinylpyridine (2VP) with the benzoylated linear polystyrene substrate in the presence of LiCl. Separate ampules containing purified styrene monomer (10 g in 50 mL THF), the 2VP capping agent in THF (0.65 g in 40 mL THF), and benzoylated linear polystyrene (1.5 g, 2.4 meq benzoyl groups equal to a 20 mol % acylation level) were first prepared.

Synthesis of the G0 arborescent polystyrene involved polymerization of styrene in 75 mL THF at −78° C. for 30 min, using 2 mmol sec-butyllithium as initiator in the presence of 20 mmol LiCl. Two to three molar equivalents of the end-capping agent 2VP was then added to give a color change from orange to dark red. A sample of the capped side chains was removed, deactivated with degassed methanol, and analyzed by SEC to reveal the polymers had a $M_n=7 \times 10^3$ g/mol and $M_w/M_n=1.15$. The living polymer was warmed to about 25° C., and the benzoylated linear polystyrene solution was slowly added until the red color almost disappeared. After 30 min, the reaction was terminated with degassed methanol. The crude product consisted of about 80% comb G0 graft polystyrene and 20% linear polystyrene by weight. The graft polymer had a low polydispersity index ($M_w/M_n=1.10$).

Although the invention has been described with reference to certain specific embodiments, various modifications thereof will be apparent to those skilled in the art without departing from the spirit and scope of the invention as outlined in the claims appended hereto.

The embodiments of the invention in which an exclusive property or privilege is claimed are defined as follows:

1. A method for producing a branched or a dendritic polymer comprising the steps of:
   a. reacting a first polymer with an acylating agent such that acyl groups are chemically bonded to said first polymer at one or more sites; and,
   b. grafting a second polymer onto said acylated first polymer such that chemical bonds are formed between said first polymer and said second polymer at said acyl groups,
said second polymer including reactive groups capable of forming bonds with said acyl groups, and wherein said bonds are formed through a nucleophilic addition reaction.

2. The method of claim 1 wherein said first polymer and said second polymer is either a homopolymer or a copolymer, and is either linear, branched or dendritic.

3. The method of claim 1 wherein said acylating agent has the formula R-COCl, wherein R is an alkyl or aryl group.

4. The method of claim 1 wherein said reactive groups on said second polymer are anionic groups.

5. The method of claim 1 wherein said second polymer includes a single reactive group.

6. The method of claim 1 wherein said reactive groups are located at a terminal position on said second polymer.

7. The method of claim 1 wherein, prior to said reaction between said first polymer and said second polymer, said second polymer is reacted with a capping agent wherein said capping agent forms a chemical bond with said reactive group.

8. The method of claim 1 wherein a cycle defined by steps (a) and (b) is repeated at least once, and wherein the polymer formed at (b) of the preceding cycle is the substrate for said acylation reaction at (a) in the subsequent cycle.

9. The method of claim 1 wherein said reaction between said reactive group on said second polymer and said acyl group on said first polymer converts said acyl group into a tertiary alcohol group, which is blocked or converted to less reactive groups, whereby the thermostability of said treated branched or dendritic polymer is increased.

10. The method of claim 9 wherein said tertiary alcohol group is converted to a chloride group.

11. The method of claim 1 wherein said reaction between said first polymer and said second polymer, a reaction modifier is utilized, said reaction modifier prevents neutralization of the anionic charge on the second polymer.

12. The method of claim 11 wherein said reaction modifier is a metal ion.

13. The method of claim 12 wherein said metal ion is lithium ion.

14. The method of claim 13 wherein said lithium ion is provided in the form of lithium chloride.

15. The method of claim 1 wherein said acyl group is derived from the group consisting of acetyl, propionyl, and benzoyl.

16. The method of claim 7 wherein said capping agent on said second polymer is derived from the group consisting of α-methylstyrene, 1,1-diphenylethylene, 2-vinylpyridine and isoprene.

17. A method of producing branched or dendritic polymers wherein:
   a) a first polymer is acylated to provide a plurality of acyl groups thereon, said acyl groups being derived from the group consisting of acetyl, propionyl, and benzoyl;
   b) reacting said acylated first polymer with a second polymer, said second polymer bearing one anionic reactive group at a substantially terminal position, said anionic reactive group on said second polymer being derived from the group consisting of α-methylstyrene, 1,1-diphenylethylene, 2-vinylpyridine, and isoprene, said reaction between said first polymer and said second polymer being a nucleophilic addition reaction between said anionic reactive group on said second polymer and said acyl group on said first polymer, resulting in a chemical bond between said first polymer and said second polymer.

18. The method of claim 17 wherein a cycle defined by steps (a) and (b) is repeated at least once, and wherein the polymer formed at (b) of the preceding cycle is the substrate for said acylation reaction at (a) in the subsequent cycle.

19. A polymer formed according to the method of claim 1.

20. A polymer formed according to the method of claim 8.

21. A polymer formed according to the method of claim 17.

* * * * *

UNITED STATES PATENT AND TRADEMARK OFFICE
CERTIFICATE OF CORRECTION

PATENT NO.     : 6,407,169 B1
DATED          : June 13, 2002
INVENTOR(S)    : Gauthier, Mario et al.

It is certified that error appears in the above-identified patent and that said Letters Patent is hereby corrected as shown below:

<u>Title page,</u>
Item [56], References Cited, OTHER PUBLICATIONS, "Al-Mallem, H. A. et al.," reference, "Al-Mallem" should read -- Al-Muallem --.

<u>Drawings,</u>
Figure 2, "$AlCl_y$" should read -- $AlCl_3$ --

Figure 2, "(A) + (B) →" should read -- $(A) + (B) \xrightarrow{LiCl}$ --.

Figure 2, insert arrow pointing to element "18".

<u>Column 1,</u>
Line 5, "Field of Invnetion" should read -- Field of Invention --.

<u>Column 5,</u>
Line 1, "group 18" should read -- group 5 --.

<u>Column 5,</u>
Line 29, "monomers are added" should read -- monomers added --.

<u>Column 7,</u>
Line 50, "generation and higher" should read -- generation 4 and higher --.
Line 63, "groups which" should read -- groups --.

<u>Column 10,</u>
Line 7, "$5 \times 10_3$" should read -- $5 \times 10^3$ --.
Line 25, "raft" should read -- graft --.

UNITED STATES PATENT AND TRADEMARK OFFICE
CERTIFICATE OF CORRECTION

PATENT NO. : 6,407,169 B1
DATED : June 13, 2002
INVENTOR(S) : Gauthier, Mario et al.

It is certified that error appears in the above-identified patent and that said Letters Patent is hereby corrected as shown below:

Column 11,
Line 39, "COCI" should read -- COCl --.

Signed and Sealed this

Twenty-seventh Day of July, 2004

JON W. DUDAS
*Acting Director of the United States Patent and Trademark Office*